United States Patent Office 3,527,027
Patented Sept. 8, 1970

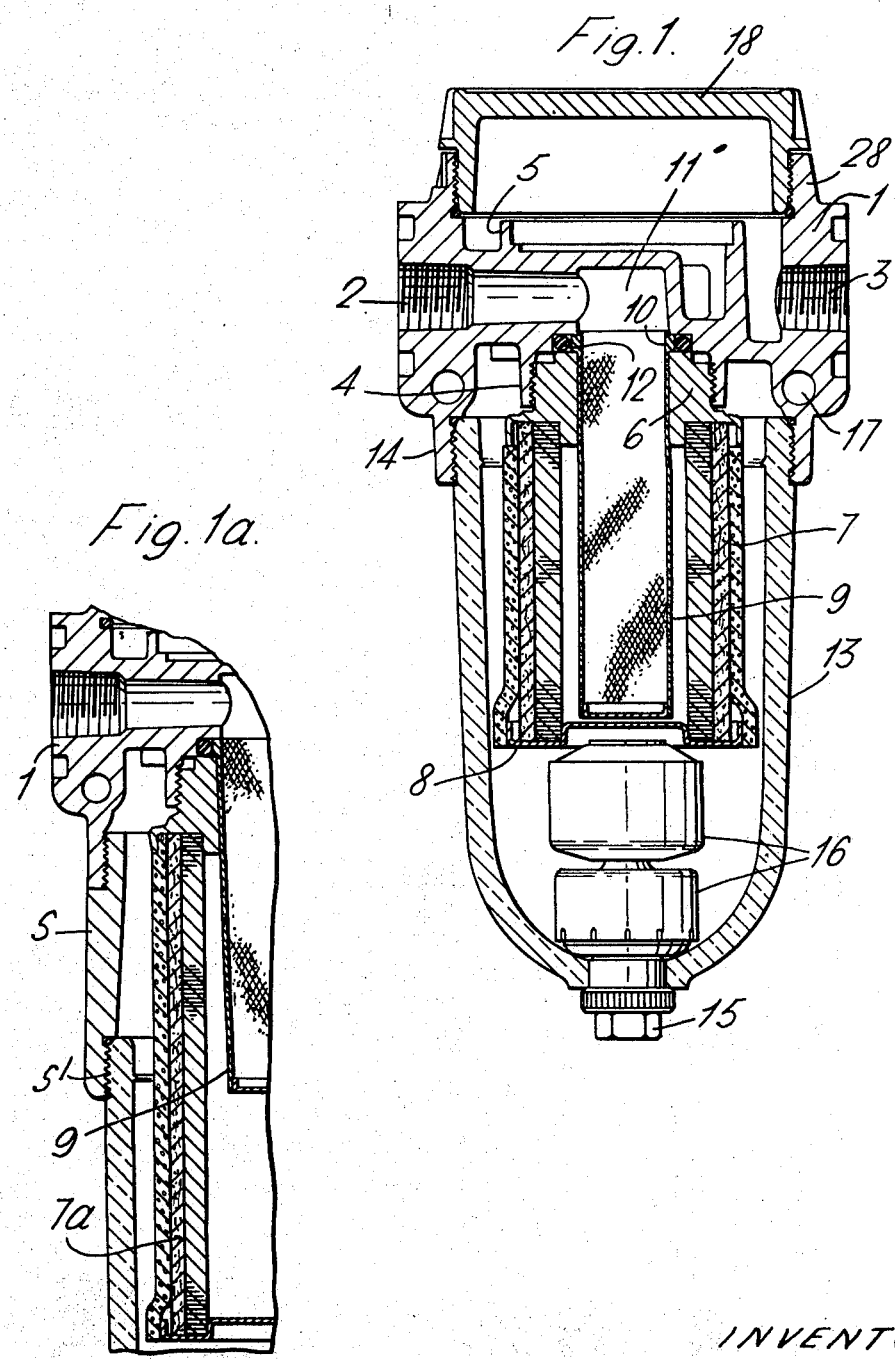

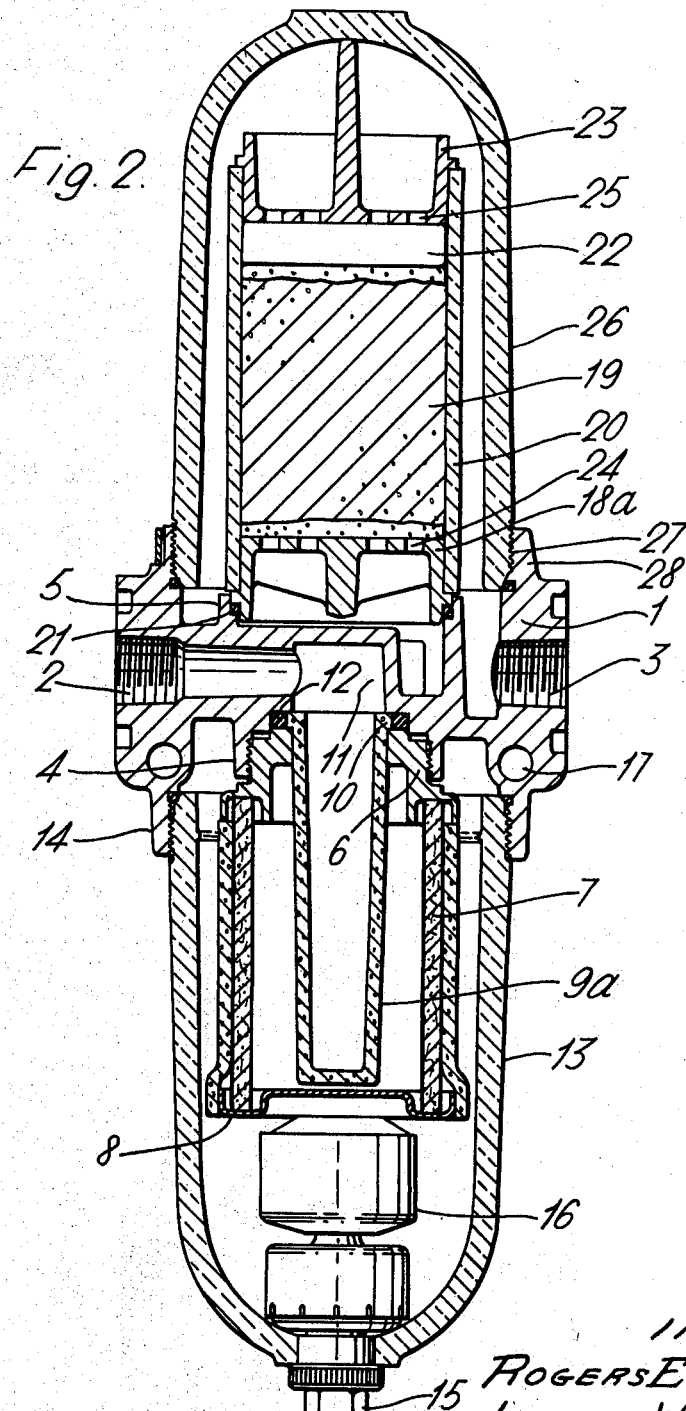

3,527,027
AIR FILTRATION APPARATUS
Rogers Evert Knight, London, and Leslie William Smith and Leonard Harris, Shipston-on-Stour, England, assignors to C. A. Norgren Limited, London, England, a British company
Filed Aug. 16, 1968, Ser. No. 753,128
Claims priority, application Great Britain, Aug. 17, 1967, 38,004/67, 38,005/67
Int. Cl. B01d 25/02
U.S. Cl. 55—275                        4 Claims

ABSTRACT OF THE DISCLOSURE

An air filtering apparatus comprising a body member having an air inlet and spaced air outlet and a bowl and tubular micro-filter coalescer detachably secured thereto. A relatively coarse hollow filter having a closure at the bottom is secured to the body member across the air inlet within the tubular micro-filter so that an incoming air stream flows into it. The micro-filter has an impervious closure at the bottom remote from the body member and surrounds the hollow filter in a spaced relation to form an intermediate closed chamber between both filters while serving to coalesce micro-size liquid droplets entrained by the incoming air entering the micro-filter from the intermediate closed chamber. The micro-filter is provided with a screw threaded ring mount at its open end so that the ring mount may be screwed to the body member and the open end of the hollow filter is clamped to the body member so that it communicates with the air inlet. Means are provided between the ring mount and the body member to seal the two filters to the body member when the ring mount is screwed to the body member. A bowl extends below the micro-filter to receive liquid coalesced by and displaced from the micro-filter. The bowl and the micro-filter may be detached from the body member allowing detachment of the hollow filter through the ring mount of the micro-filter.

---

The present invention relates to apparatus for the filtration of air or other gaseous media, and since the apparatus is primarily intended for air filtration, the term "air" will be used hereinafter although the apparatus may be used with other gaseous media.

A filter is available known as an "ultra-high efficiency filter" (hereinafter called "a micro-filter"), which can filter out particles below 1 micron. One such filter is manufactured and sold by Domnick Hunter (Engineers) Limited and consists essentially of boro-silicate glass micro-fibers (mean fiber size 0.5 micron) reinforced to eliminate fiber migration even when subjected to shock pressure loads.

The purpose of the air filtration apparatus is to incorporate a micro-filter, as above defined, to act as a coalescing filter which will cause small particles of water and/or oil mist in the air passing through the apparatus to coalesce into large liquid droplets which can drain by gravity. However we have found that such a filter is likely to clog, especially when the air contains dirt particles in addition to the liquid to be removed, so that the invention has an object to obviate or reduce this clogging tendency with a compact arrangement of the filters.

To prevent clogging, the present invention provides a filtering apparatus comprising a tubular micro-filter having within it a porous-walled hollow filter element relatively coarse in relation to the micro-filter but capable of retaining particles of a size below 35 microns. However, the hollow filter element preferably retains particles of a size below 25 microns. The interior of the hollow filter element is in communication with an air inlet of the apparatus; the arrangement being such that air passing outwards through the hollow filter element will then pass through the micro-filter, and means external to the micro-filter for receiving liquid coalesced by the micro-filter. The porous hollow filter element may be such as to retain particles having a size above 1 micron and not exceeding 5 microns.

The porous-walled filter may be formed of sintered metal as for example sintered bronze, or of a porous plastics material, and it may be in the form of a deep cup-shaped element, the open end of which is in communication with the air inlet, or it may be of a rigid or semi-rigid coherent or self-retaining structure. This porous filter is coarse in relation to the micro-filter, but it is fine in relation to gauze and like conventional filters and serves mainly to hold back the dirt particles which would tend to choke the micro-filter.

The micro-filter and the porous-walled filter may be supported in a transparent or translucent bowl or a bowl of metal or other material by means of a body member which is ported for connecting the air inlet to the interior of the porous filter and provided with an outlet for the air which has passed through the successive filters.

The bowl may have a suitable drain which may be manually controlled or adapted to open when a predetermined level of liquid has collected in the bowl, as for example by float or other suitable control.

Although the micro-filter is highly effective in transforming sub-micron liquid as for example oil and/or water particles into larger droplets, which exude from the outer surface of the filter and are freed for collection during the separation process, liquid traces may in some cases be entrained with the air from the micro-filter. Another embodiment of apparatus according to the invention is provided with a filter pack which is capable of absorbing liquid traces. An indicator may also be provided which is responsive to color change in the presence of any liquid which may have been entrained with the air through the filter pack to indicate that the apparatus needs inspection and possibly cleaning or renewing of the filter elements.

Thus the apparatus according to the various embodiments may comprise a liquid adsorbent or absorbent pack between the micro-filter and the outlet. If desired an indicator pack may be provided which is impregnated or has a surrounding band impregnated with a substance which changes color in response to moisture; particularly oil and/or water, or other foreign material remaining in the air leaving the pack which is responsive to the selected color-change material.

The filter pack may be of activated carbon, silica gel, activated alumina or molecular sieve form and the color indicator may be of any form with the particles or granules impregnated or coated with a substance which will change color. The substance will be determined depending upon the nature of the liquid, and by the suitable choice of the color-change medium, the presence of carbon monoxide gas or other gaseous material may be detected. Cobalt chloride is a well-known substance which is suitable for the detection of water and any suitable color-change solvent compound of those listed in the Color Index will serve when the liquid is oil.

The body member on its side opposite to the aforesaid bowl may support an inverted bowl, which may be of transparent or translucent material. If a condition of high pressure, or temperature or solvent laden atmosphere has to be met it may be desirable to make the bowl of metal with an indicator inspection window of material suitably resistant to such a condition. The body member may be as previously described in that it is ported for connecting the air inlet to the interior of the porous filter, and it may be provided with an outlet with which the bowl containing the filter and indicator packs communicates. Air-flow from the first bowl goes through the body member and thence through the filtering and indicator packs to the second bowl and the outlet.

In order that the invention may be the more readily understood, reference is hereinafter made to the embodiments described in the specification and illustrated in the accompanying drawings, wherein FIG. 1 is a sectional elevation of one embodiment of the invention; FIG. 1a is a fragmentary sectional view showing an adaptor sleeve; and FIG. 2 is a sectional elevation of another embodiment of the invention.

The apparatus illustrated in FIG. 1 comprises a body member 1 provided with an inlet port 2 through which air may be delivered under pressure, and an outlet 3.

The body member 1 has an internally threaded hub portion 4.

To the hub portion 4 is screwed the upper end mount 6 of a tubular micro-filter 7. The tubular micro-filter 7 is preferably in the form of a boro-silicate glass micro-fiber filter which can filter down to 0.3 micron, the filter being within a porous plastics sock or sheath. The filter converts oil and water mist to liquid form. Liquids built up inside the filter are eventually forced through to the other surface, the porous sock or sheath preventing re-transmission of the larger droplets which fall into the bowl. The lower end of the micro-filter is closed by end closure 8.

A deep-cup shaped rigid or semirigid porous-walled filter element 9, constructed for example of sintered bronze or porous plastics material, is flanged at its open end at 10, and is secured in registering relation with a center chamber 11 with which the inlet port 2 communicates. The micro-filter mount 6 is screwed to the hub 4 of the body member so that it is sealed by the sealing ring 12 with the body while also clamping and sealing the porous walled filter 9.

A semi-rigid porous walled filter 9 is shown in FIG. 1, It is a filter produced from a sheet of the material sold as "Vyon" (basically a high density porous polythene) and obtainable from Porous Plastics Limited of Dagenham, England, the sheet material being folded to tubular form and secured at adjacent edges or margins as for example by welding, and closed at one end. Such a filter as far as is known cannot be produced effectively to retain particles of sub-micron size but it can be produced to retain particles of much finer size than gauze and similar conventional filters and it is well suited for protecting the expensive micro-filter from undue loading with particles which cannot pass the micro-filter. A rigid porous-walled filter of sintered metal is shown in the embodiment illustrated in FIG. 2 which will be described later. It should be noted that certain ceramic materials will also serve the purpose.

The micro-filter and the porous-walled filter concentrically positioned within are enclosed by a transparent or translucent bowl 13 which is screwed into the ring portion 14 of the body member 1.

The bowl includes a drain 15 which may open by virtue of the operation of a known float-valve control 16 in response to a predetermined level of liquid collecting in the lower part of the bowl, or the drain can be manually opened.

The body member may be mounted on a wall by screws or other members passed through holes 17.

To the upper side of the body is fitted a detachable cap 18. The body may be shaped so that when the cap is removed a unit comprising filter and color indicating packs may be fitted as is hereinafter described with reference to FIG. 2.

In the use of the apparatus, compressed air may be delivered through the inlet 2 into the interior of the porous-walled filter element 9. The air passes through filter element 9 into the annular chamber formed between the porous-walled filter element 9 and the micro-filter 7. The air leaving the micro-filter will be nearly free from liquid and solid particles, the liquid material tending to percolate or be forced by the air pressure into the micro-filter. Liquid material draining off the external surface of the micro-filter and from the sock can collect in the bottom of the bowl and be drained off, either automatically as described or manually.

The air after passing through the micro-filter passes into the body member 1 which is suitably apertured for this purpose, to the outlet 3.

An adaptor sleeve S as shown by FIG. 1a, permits the insertion of longer filter elements 7a which may be fitted to the underside of the body member, i.e., screwed to the latter in place of the bowl and formed with a screwed ring portion $S^1$ comparable to that on the body member to enable the same bowl to be fitted.

In the apparatus illustrated in FIG. 2 the components insofar as they correspond with the like components shown in FIG. 1, are similarly numbered.

It will be seen that the body member 1 is of the same construction in both figures. It has a location ring portion 5 the purpose of which will be described later.

The porous walled filter 9a shown in FIG. 2 is a deep pot of sintered metal, as for example sintered bronze or of a rigid nature, although the porous plastics filter previously referred to in describing FIG. 1 could likewise be used in the embodiment of FIG. 2 or the sintered filter could be used in the embodiment of FIG. 1.

With the cap 18, shown in FIG. 1, removed, as is shown in FIG. 2 there is fitted to the upper side of the body member 1 and located by the ring portion 5 an inverted cup-shaped base 18a of a filter pack 19 of loose material contained in a transparent or translucent cylinder 20. This filter pack 19 is adapted to absorb traces of liquid which may have been entrained with the air coming from the micro-filter. The base 18a is sealed to the body member 1 with the aid of the sealing ring 21 fitted fluid tight in the cylinder. The material of the filter pack 19 is preferably of activated carbon in the form described, but it may be of any of the other materials previously indicated.

Above the filter pack 19 in the cylinder is an indicator pack 22 impregnated or coated with a color change medium, which medium will be chosen in dependence upon the liquid to be indicated, as previously mentioned. The color indicator pack 22 is retained by an inverted centrally stemmed closure cap 23. The closure cap 23 is separated from the absorbent pack by a perforated plate. The indicator pack 22 in the form described is of expanded polystyrene either impregnated, or having a surrounding circumferential band impregnated, to change color from say white to red to indicate the presence of oil. A suitable color change substance is Waxoline Red O.S. manufactured by I.C.I. Ltd. The indicator pack may however be of felt, silica gel, activated alumina, a molecular sieve or of any of the other materials described in connection with the filter pack.

The base member 18a and the end cap 23 are suitably perforated as indicated at 24 and 25 respectively to allow for the air flow through the filter pack 19 and the color indicator pack 22, from the bowl 13 and through the body member.

The cylinder 20 containing the filter pack 19 and the color indicator pack 22 is enclosed by an inverted bowl 26 of transparent or translucent material, the open end of which is screwed at 27 within the ring portion 28 of the body member 1. Screwing the bowl 26 to the body member causes the stemmed cap 23 to seal the lower end cap 18 to the body member.

The air nearly purified by the micro-filter 7 can pass upwards through the body member 1 into the inverted cup-shaped member 18a and through the perforations 24 into the filter pack 19 which absorbs traces of oil or hydrocarbon gas or vapour which may still be present in the air. The air passes through filter pack 19 and escapes through the color indicator pack 22 and the end cap 23 into the inverted upper bowl 26 where it passes through the outlet 3 in the body member.

When, after a period of use, liquid may be present in the air leaving the filter pack, the liquid still present will cause a color change in the color change substance of the indicator pack and this color change will be visible through the cylindrical wall 20 of the filter unit and the transparent bowl 26. The bowls can then be readily removed and access had to the several filters for inspection and if necessary the several filter elements and the indicator pack can be readily removed for cleaning or renewal.

The two embodiments described are particularly well suited for use with pipe bores of ½" or less.

What is claimed is:

1. Air filtering apparatus comprising a body member having an air inlet and a spaced air outlet, a bowl detachably secured to said body member; a tubular micro-fiber filter coalescer for removing submicron droplets detachably secured to said body member; a separate relatively coarse hollow filter having a closure at the bottom secured to said body member across said air inlet within said micro-fiber filter and communicating with said body member air inlet to permit an incoming air stream to flow into said hollow filter; said micro-fiber filter having an impervious closure at the bottom being closed at its end remote from the said body member and open at its opposite end and surrounding said hollow filter in spaced relation thereto to form an intermediate closed chamber between said filters; said micro-fiber filter being spaced from the bottom and the sides of the bowl and serving to coalesce micro-size liquid droplets entrained by incoming air entering said micro-fiber filter said coarse filter and from said intermediate closed chamber; said bowl extending below said micro-fiber filter to receive liquid coalesced by and displaced from the exterior of said micro-fiber filter; said micro-fiber filter being provided with a screw-threaded ring mount at its open end, said ring mount being screwed to said body member and clamping the open end of said hollow filter to said body member about said inlet so that it communicates with the body member inlet and means between said ring mount and said body member sealing the two filters to said body member when the ring mount is screwed to said body member to secure the hollow filter; the detachment of said bowl and said micro-fiber filter from said body member permitting detachment of said hollow filter through the said ring mount of the micro-fiber filter.

2. Air filtering apparatus according to claim 1 wherein said hollow filter is in the form of a sintered metal one-piece deep pot outwardly flanged at its open end.

3. Air filtering apparatus according to claim 1, wherein said hollow filter is a tube of porous plastic material with a closure at one end forming with the tube a deep pot and with an outward flange at the other end.

4. Air filtering apparatus according to claim 1, comprising an adsorbent filter pack arranged between said micro-fiber filter and said body member outlet coaxially with said micro-fiber filter but on the other side of said body member, said filter pack being adapted to adsorb liquid that may be entrained with the air which has come from said micro-fiber filter through the body member to said pack, said pack being part of a unit which is screwed to said body member.

References Cited

UNITED STATES PATENTS

| | | | |
|---|---|---|---|
| 1,412,790 | 4/1922 | Vehling | 55—480 |
| 2,096,851 | 10/1937 | Fricke | 55—480 |
| 2,413,769 | 1/1947 | Kasten | 55—480 |
| 2,528,539 | 11/1950 | Norgren et al. | 55—323 |
| 3,093,467 | 6/1963 | McLaughlin. | |
| 3,115,459 | 12/1963 | Giesse. | |
| 3,228,527 | 1/1966 | McPherson. | |
| 3,312,350 | 4/1967 | Kasten | 210—307 |
| 3,347,026 | 10/1967 | Zankey | 55—387 |
| 3,353,682 | 11/1967 | Pall et al. | 210—505 |
| 3,418,789 | 12/1968 | Hoffman et al. | 55—337 |
| 2,402,140 | 6/1946 | Heintzelman | 55—482 |

FRANK W. LUTTER, Primary Examiner

B. NOZICK, Assistant Examiner

U.S. Cl. X.R.

55—316, 487, 523, 527